Aug. 13, 1929.  A. E. GIBSON  1,724,797
INSECT TRAP
Filed April 13, 1928   2 Sheets-Sheet 1

INVENTOR.
Albert E. Gibson,
BY
Geo. F. Kimmel
ATTORNEY.

Aug. 13, 1929.     A. E. GIBSON     1,724,797
INSECT TRAP
Filed April 13, 1928     2 Sheets-Sheet 2
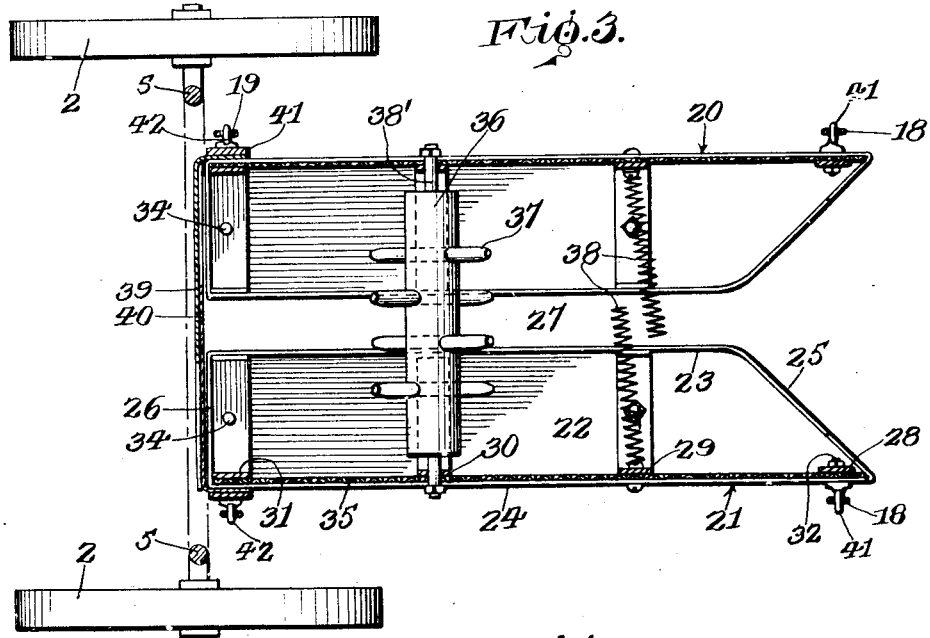
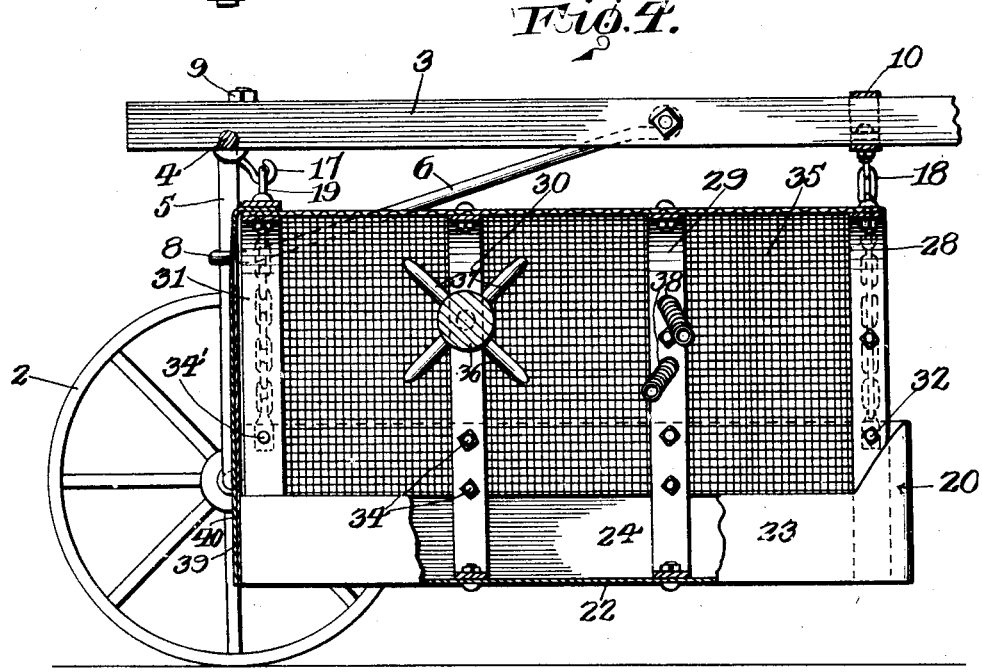
INVENTOR.
Albert E. Gibson,
BY
Geo. P. Kimmel
ATTORNEY.

Patented Aug. 13, 1929.

1,724,797

UNITED STATES PATENT OFFICE.

ALBERT E. GIBSON, OF ELECTRA, TEXAS.

INSECT TRAP.

Application filed April 13, 1928. Serial No. 269,776.

This invention relates to an insect trap designed primarily for trapping and destroying boll-weevil, but it is to be understood that a trap, in accordance with this invention may be employed in any connection for which it is found applicable, and the invention has for its object to provide, in a manner as hereinafter set forth, a mobile trap for connection to a cultivator tongue constructed and arranged for straddling a row of plants and for agitating the plants to dislodge the insects therefrom, as well as estopping and destroying the insects dislodged from the plants.

Further objects of the invention are to provide, in a manner as hereinafter set forth, a trap for the purpose referred to which is comparatively simple in its construction and arrangement, strong, durable, compact, thoroughly efficient in its use, conveniently assembled, readily installed with respect to a cultivator tongue and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:—

Figure 3 is a sectional plan of the trap.

Figure 4 is a fragmentary view in longitudinal section of the trap as suspended from the cultivator tongue.

Figure 1:
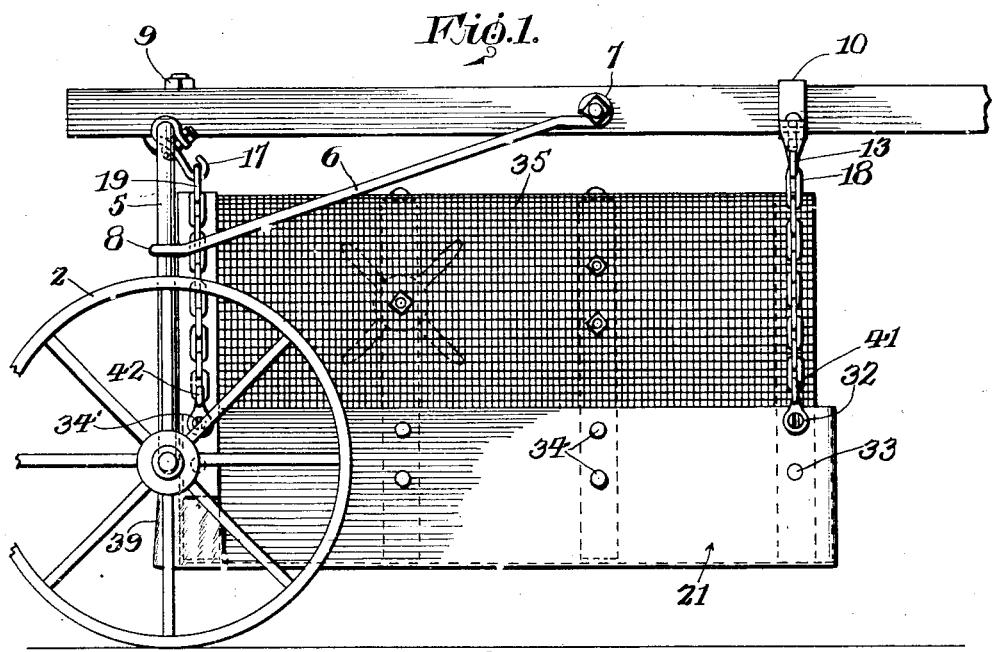
Figure 1 is a side elevation of an insect trap in accordance with this invention showing the adaptation thereof with respect to the tongue of a cultivator.

Referring to the drawings in detail 1 denotes the arched axle of a cultivator, 2 the wheels carried by the axle 1, and 3 the cultivator tongue which is fixedly secured to and extends forwardly from the axle 1.

The top of the axle 1 is indicated at 4 and the sides thereof at 5. Forwardly extending and inwardly inclined brace members 6 are provided for the tongue 3. The forward ends of the members 6 are fixedly secured to the sides of the tongue as at 7 and the rear ends thereof are looped around the sides 5 of the axle 1, as at 8. The tongue 3 is connected to the top 4 of the axle 1 by a coupling bolt 9.

Positioned on the tongue 3, a substantial distance from the forward ends of the members 6 is a suspension element consisting of an inverted yoke-shaped body portion 10 which has extending laterally from the lower end therefrom in opposite directions a pair of arms 11, each having at the outer part thereof a depending outwardly inclined hook portion 13. The height of the body 10 is less than the height of the tongue 3 and positioned against the bottom of the latter is a coupling plate 14, which in connection with the holdfast devices 15 secure the suspension element to the tongue 3. The holdfast devices 15 extend through the plate 14 and through the arms 11.

Mounted on the top 4 of the axle 1, in proximity to the sides 5 of the latter, are hangers 16 each formed with a forwardly directed, downwardly inclined hook 17. Depending from each hook portion 13 is a hanger chain 18 and depending from each hook 17 is a hanger chain 19.

The trap includes a pair of oppositely disposed, spaced open top receptacles indicated generally at 20, 21, and as each of said receptacles is of like construction, but one will be described as the description of one will apply to the other. Each receptacle is adapted to contain a body of insecticide for the purpose of killing the insects which are trapped in the receptacles. Each receptacle comprises a bottom 22, an inner side wall 23, an outer side wall 24, a front end wall 25 and a rear end wall 26. The outer side wall 24 is of greater length and of greater height than the length and height of the inner side wall 23. The forward end wall inclines rearwardly from the forward end of the outer side wall 24 to the forward end of the inner side wall 23. A part of the end wall 25 is of the same height as the height of the inner side wall 23 and the remaining portion of the end wall gradually increases in height toward an outer side wall. The rear end wall 26 is formed in the same manner as the front end wall 25.

The receptacles 20, 21 are spaced a substantial distance from each other, as indicated at 27 to provide a passage for the plants of the row. Secured to the receptacles 20, 21 are a series of spaced, aligning arches providing supports and also providing for the spacing of the receptacles relatively to each other. The arches are indicated at 28, 29, 30, 31. The arch 28 is formed from a metallic strap of the desired width bent in semi-oval form and has its ends secured to the inner faces of the outer side walls 24 of the receptacles by the holdfast devices 32, 33. The arch 28 has its lower ends seating on the bottoms 22 of the receptacles.

The arches 29, 30 and 31 are formed from metallic straps bent in semi-oval contour, but the straps are of greater length than the straps from which the arch 28 is formed. Each of the arches 29, 30 and 31 is secured to the bottoms and inner side and outer side walls of the receptacles by the holdfast devices 34, 34'.

Connected to and extending above the receptacles is an inverted oval-shaped canopy constituting a confining member 35 formed from a sheet of foraminous material. The element 35 extends from the forward ends of the side walls 24 of the receptacles to the rear ends of said walls and are mounted on and secured to the arches 28, 29, 30 and 31. The element 35 is interposed between the arches and the side walls 24 of the receptacles. The element 35 also constitutes a covering for the receptacles.

Rotatably supported between the sides of the arch 30, a substantial distance above the receptacles and extending transversely with respect to the latter is an agitator consisting of a cylindrical member 36 provided with a series of radially extending arms 37. The member 36 is loosely mounted on a coupling bolt 38', which connects the sides of the arch 30 together.

Carried by each side of the arch 29 are inwardly extending inclined resilient fingers 38 which coact with the agitator for dislodging the insects from the plants during the travel of the cultivator. The fingers 38 are arranged forwardly of the agitator.

To prevent the insects from passing out from the rear of the trap a pair of overlapping flexible curtains 39, 40 are employed and which are secured by an arch-shaped strap 41 against the rear of the element 35. The curtains 39, 40 extend to the bottoms and are arranged exteriorly of the receptacles, but their flexibility is such as not to interfere with the trap when straddling the plant as the trap is carried forwardly by the tongue 3 of the cultivator.

Figure 2:
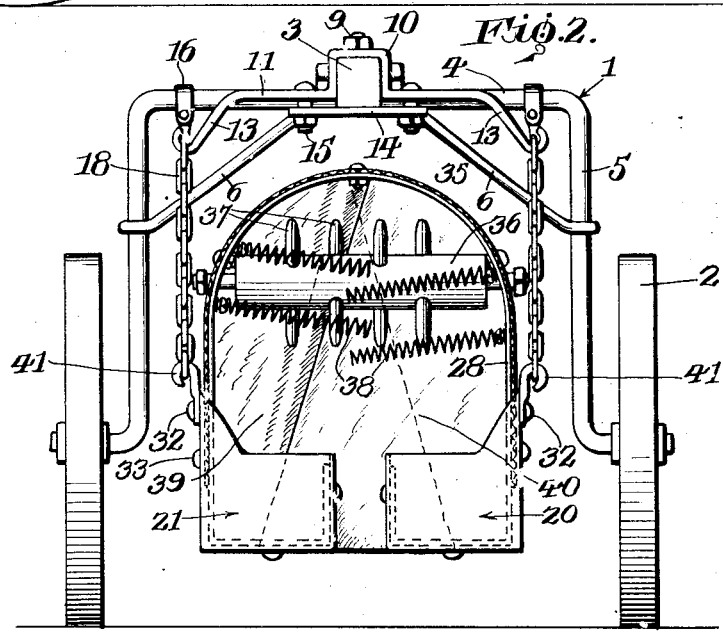
Figure 2 is a front elevation thereof and with the trap suspended from the cultivator.

Secured to the forward ends of the outer side walls 24 of the receptacles 20, 21 by the holdfast devices 32 are upstanding rigid hooks 41 with which engage the lower ends of the hanger chains 18. Secured to the outer side walls of the receptacles 20, 21 at the rear thereof by the holdfast devices 34' are upstanding rigid hooks 42 for engagement with the lower links of the chains 19. The hooks 40, 42 provide means, in connection with the chains 18, 19 for suspending the trap from the tongue a substantial distance above the ground and in the manner as shown in Figures 1 and 2.

As the cultivator moves forwardly the row of plants will pass between the receptacles 20, 21 and the agitator and resilient fingers will dislodge the insects from the plants and the insects flying against the member 35 will be arrested from passing from the trap, drop into the insecticide in the receptacles and be destroyed. The curtains 39, 40 will also provide arresting means for the insects.

It is thought the many advantages of an insect trap, in accordance with this invention and for the purpose set forth can be readily understood, and although the preferred embodiment of the invention is as illustrated and described, yet it is to be understood that changes in the details of construction can be had which fall within the scope of the invention as claimed.

What I claim is:

An insect trap including a pair of spaced open top insecticide containing receptacles, a plurality of spaced supporting members each having the lower portions thereof secured with the bottom, inner side, and outer side walls of said receptacles, a foraminous canopy extended above said receptacles and secured to said members, a pair of flexible, overlapping curtains secured to the canopy and positioned at the rear of said receptacles and extending to the bottoms of the latter, a coupling bolt extending transversely of the trap and connecting the sides of one of said members together, an agitator revolubly mounted on said bolt and having a plurality of radially extending arms, resilient fingers having their outer ends anchored to opposite sides of one of said members and having their inner ends disposed in superposed, spaced, overlapping relation, said fingers being disposed forwardly of said agitator in spaced relation to said arms, a pair of spaced hooks secured to the outer side wall of each receptacle, a hanger chain attached to each hook, and means disposed in the vertical planes of said hooks for suspending said chains.

In testimony whereof, I affix my signature hereto.

ALBERT E. GIBSON.